United States Patent
Oberg et al.

(10) Patent No.: US 7,337,063 B1
(45) Date of Patent: Feb. 26, 2008

(54) METHOD AND SYSTEM FOR USING DATABASE AND GPS DATA TO LINEARIZE VOR AND ILS NAVIGATION DATA

(75) Inventors: Michael Oberg, Olathe, KS (US); Zhe Lin, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 679 days.

(21) Appl. No.: 10/736,969

(22) Filed: Dec. 16, 2003

(51) Int. Cl.
*G01C 21/00* (2006.01)

(52) U.S. Cl. .......................... 701/213; 701/4; 701/120; 701/208

(58) Field of Classification Search ................ 701/213, 701/117, 120, 17, 4, 208; 342/36, 407; 244/183
See application file for complete search history.

(56) References Cited

U.S. PATENT DOCUMENTS

| | | | | |
|---|---|---|---|---|
| 3,781,891 | A * | 12/1973 | Moose | 342/411 |
| 5,305,010 | A * | 4/1994 | Davidson | 342/401 |
| 5,323,306 | A * | 6/1994 | Storli et al. | 701/219 |
| 6,182,005 | B1 * | 1/2001 | Pilley et al. | 701/120 |
| 6,314,363 | B1 * | 11/2001 | Pilley et al. | 701/120 |
| 2004/0225432 | A1 * | 11/2004 | Pilley et al. | 701/117 |

FOREIGN PATENT DOCUMENTS

| FR | 2496347 A | * | 6/1982 |
|---|---|---|---|
| JP | 57121302 A | * | 7/1982 |
| NO | 8102620 A | * | 7/1982 |

OTHER PUBLICATIONS

Unknown author, IEEE standard definitions of navigation aid terms, Jun. 22, 1983—This standard represents a revision of material contained in the previous edition of IEEE Std 172-1971.*
Delgado-Restituto et al., Design considerations for integrated continuous-time chaotic oscillators, Circuits and Systems I: Fundamental Theory and Applications, IEEE Transactions on [see also Circuits and Systems I: Regular Papers, IEEE Transactions on], vol. 45, Issue 4, Apr. 1998 pp. 481-495.*
C. Mutti et al., Optimal power loading for multiple-input single-output ofdm systems with bit-level interleaving, IEEE Transaction on Wireless Communications, vol. 5 issue 7, Jul. 2006, pp. 1886-1895.*

(Continued)

*Primary Examiner*—Cuong Nguyen
(74) *Attorney, Agent, or Firm*—Kevin E. West; Samuel M. Korte

(57) ABSTRACT

A method and system for determining a deviation of a vehicle from a desired course are described. The method includes receiving bearing signals from a transmitter, accessing a database, on the vehicle, to obtain transmitter position information identifying a position of the transmitter, obtaining vehicle position information using GPS identifying a current position of the vehicle, and determining a deviation of the vehicle from the desired course utilizing the transmitter position information, the vehicle position information, and the bearing signal. The system includes a receiver receiving a bearing signal from a transmitter, a database storing transmitter position information identifying a position of the transmitter, a GPS receiver obtaining vehicle position information identifying a current position of the vehicle based on a GPS signal, and a controller determining a deviation of the vehicle from the desired course utilizing the transmitter position information, the vehicle position information, and the bearing signal.

29 Claims, 9 Drawing Sheets

OTHER PUBLICATIONS

T. Vaidis et al., Block adaptive techniques for channel identification and data demodulation over band-limited channels, IEEE Transactions on Communications, vol. 46 issue 2, Feb. 1998, pp. 232-243.*

Unknown author, ISIT 2005 Abstracts Book; Information Theory, 2005. ISIT 2005. Proceedings. International Symposium on Sep. 4-9, 2005 pp. 705-782 ; Digital Object Identifier 10.1109/ISIT.2005.1523279.*

Unknown author, ISIT 2005 CDROM Table of Contents; Information Theory, 2005. ISIT 2005. Proceedings. International Symposium on; Sep. 4-9, 2005 pp. 203-701; Digital Object Identifier 10.1109/ISIT.2005.1523275.*

VOR/DME system improvements, Winick, A.B.; Brandewie, D.M.;, Proceedings of the IEEE vol. 58, Issue 3, Mar. 1970 pp. 430-437.*

* cited by examiner

METHOD AND SYSTEM FOR USING DATABASE AND GPS DATA TO LINEARIZE VOR AND ILS NAVIGATION DATA

BACKGROUND OF THE INVENTION

The present invention relates generally to aircraft navigation and landing. More specifically, embodiments of the invention relate to methods and systems for navigating and landing aircraft.

A VHF (very high frequency) Omni-directional Range (VOR) navigation system is implemented by dispersing VOR transmitter facilities across a geographic area. VOR receivers are located on aircraft which navigate through such a geographic area. The basic principle of operation of the VOR navigation system includes transmission from the VOR transmitter facilities transmitting two signals at the same time. One VOR signal is transmitted constantly in all directions, while the other is rotatably transmitted about the VOR transmission facility. The airborne VOR receiver receives both signals, analyzes a phase difference between the two signals, and interprets the result as a radial to or from the VOR transmitter 100. The VOR navigation system allows a pilot to simply, accurately, and without ambiguity navigate from VOR transmitter facility to VOR transmitter facility. Each VOR transmission facility operates at frequencies that are different from surrounding VOR transmitters. Therefore a pilot can tune their VOR receiver to the VOR transmission facility to which they wish to navigate. Widely introduced in the 1950s, VOR remains one of the primary navigation systems used in aircraft navigation.

The rotating transmission signal is achieved through use of a phased array antenna at the VOR transmission facility. Separation between elements of the array causes nulls in the signal received at the aircraft. Element separation may also cause erratic signal reception when an aircraft is within an area above the antenna array. Such nulls result in a conically shaped area originated at the VOR transmitter and extending upward and outward at a known angle. The conically shaped area is sometimes referred to as a cone of confusion. When an aircraft is within the cone of confusion, a pilot typically navigates utilizing only heading information, a process sometimes referred to as dead-reckoning. It is advantageous for a pilot to know that he or she is entering the cone of confusion.

An instrument landing system (ILS) also includes ground based transmitters, located at runways, and airborne receivers. The ILS transmitters transmit signals, received by the receivers on the aircraft, which are utilized to align an aircraft's approach to a runway. Typically, an ILS consists of two portions, a localizer portion and a glide slope portion. The localizer portion is utilized to provide lateral guidance and includes a localizer transmitter located at the far end of the runway. The glide slope portionprovides vertical guidance to a runway and includes a glide slope transmitter located at the approach end of the runway. More specifically, a localizer signal provides azimuth, or lateral, deviation information which is utilized in guiding the aircraft to the centerline of the runway. The localizer signal is similar to a VOR signal except that it provides radial information for only a single course, the runway heading. The localizer signal includes two modulated signals, and a null between the two signals is along the centerline path to the runway.

The glide slope provides vertical guidance to the aircraft during the ILS approach. The glide slope includes two modulated signals, with a null between the two signals being oriented along the glide path angle to the runway. If the aircraft is properly aligned with the glide slope signal, the aircraft should land in a touchdown area of the runway. A standard glide slope or glide path angle is three degrees from horizontal, downhill, to the approach-end of the runway. Known flight guidance systems, sometimes referred to as flight control systems, are configured to assume a nominal glide path angle, for example, three degrees. Some known flight guidance systems have difficulty capturing the null in the glide slope signal at runways whose glide path angle varies significantly from the assumed glide path angle.

The VOR, localizer, and glide slope all provide an angular deviation from a desired flight path. The angular deviation is the angle between the current flight path and the desired flight path. Depending on a distance from a transmitter, a linear change to the flight path to correct an angular deviation can vary widely. A linear deviation is the current distance between the current flight path and the desired flight path. Furthermore, most flight guidance systems are better suited to receive and process linear deviations from a desired flight path. Known flight guidance systems utilize data from distance measuring equipment (DME) and radar altimeters to convert angular deviations in one or more of VOR, localizer, and glide slope, into linear deviations that can be acted upon by a pilot or a flight guidance system. Therefore, aircraft not equipped with DME or a radar altimeter are not able to convert the angular deviations into linear deviations that can be optimally acted upon by the flight guidance system.

Known flight guidance systems utilize distance information from DME to estimate a distance to a VOR transmitter. The estimated distance, along with an angular deviation as determined from the VOR bearing is utilized to determine a linear deviation from a desired flight path and detect a cone of confusion. However, this approach assumes a default VOR transmitter station elevation, that the aircraft is equipped with DME, and that a DME station is co-located with the VOR transmitter.

Known flight guidance systems also utilize altitude information from, for example, a radar altimeter to estimate localizer deviations. The altitude, along with an angular deviation as determined by the localizer receiver is utilized along with an assumption of runway length to determine a localizer linear deviation from a desired flight path. For glide slope linear deviations, the altitude, an angular deviation as determined by a glide slope receiver, and an assumed glide path angle are utilized to estimate the linear deviation from a desired glide slope. These estimations assume that the aircraft is equipped with an altitude measuring device (e.g. radar altimeter). It would be advantageous to utilize actual data relating to VOR, localizers, glide slopes, and runway lengths and altitudes when providing a pilot or an auto pilot system navigation data. Similarly, it would be advantageous to provide such navigation data in aircraft which are not equipped with radar altimeters or DME.

BRIEF DESCRIPTION OF THE INVENTION

In one embodiment of the present invention, a method for determining the deviation of a vehicle from a desired course is provided. The method comprises receiving bearing signals from a transmitter, accessing a database, on the vehicle, to obtain transmitter position information identifying, a position of the transmitter, obtaining vehicle position information using GPS identifying a current position of the vehicle, and determining a deviation of the vehicle from the desired course utilizing the transmitter position information, the vehicle position information, and the bearing signal.

In another embodiment of the present invention, a system for determining a deviation of a vehicle from a desired course is provided. The system comprises a receiver receiving a bearing signal from a transmitter, a database storing transmitter position information identifying a position of the transmitter, a GPS receiver obtaining vehicle position information identifying a current position of the vehicle based on a GPS signal, and a controller determining a deviation of the vehicle from the desired course utilizing the transmitter position information, the vehicle position information, and the bearing signal.

In still another embodiment of the present invention, a flight control system is provided that comprises a database and a flight director. The data from the database is available to the flight director, and pitch and roll commands initiating from the flight director are based at least partially on the data within the database.

In yet another embodiment of the present invention, a computer program product embodied on a computer readable medium for determining a deviation of a vehicle from a desired course is provided which comprises a data reception source code segment, a database access source code segment, and a determination source code segment. The data reception source code segment receives data relating to an angular deviation of the vehicle as determined from bearing signals received from a transmitter, and data relating to a position of the vehicle. The database access source code segment retrieves data from a database relating to a position of the transmitter supplying the bearing signals. The determination source code segment determines a linear deviation from a desired path utilizing the data relating to angular deviation, the data relating to transmitter position, and the data relating to vehicle position.

BRIEF DESCRIPTION OF THE DRAWINGS

The objects and features of the invention noted above are explained in more detail with reference to the drawings which form a part of the specification and which are to be read in conjunction therewith, and in which like reference numerals denote like elements in the various views.

DETAILED DESCRIPTION OF THE INVENTION

Figure 1:
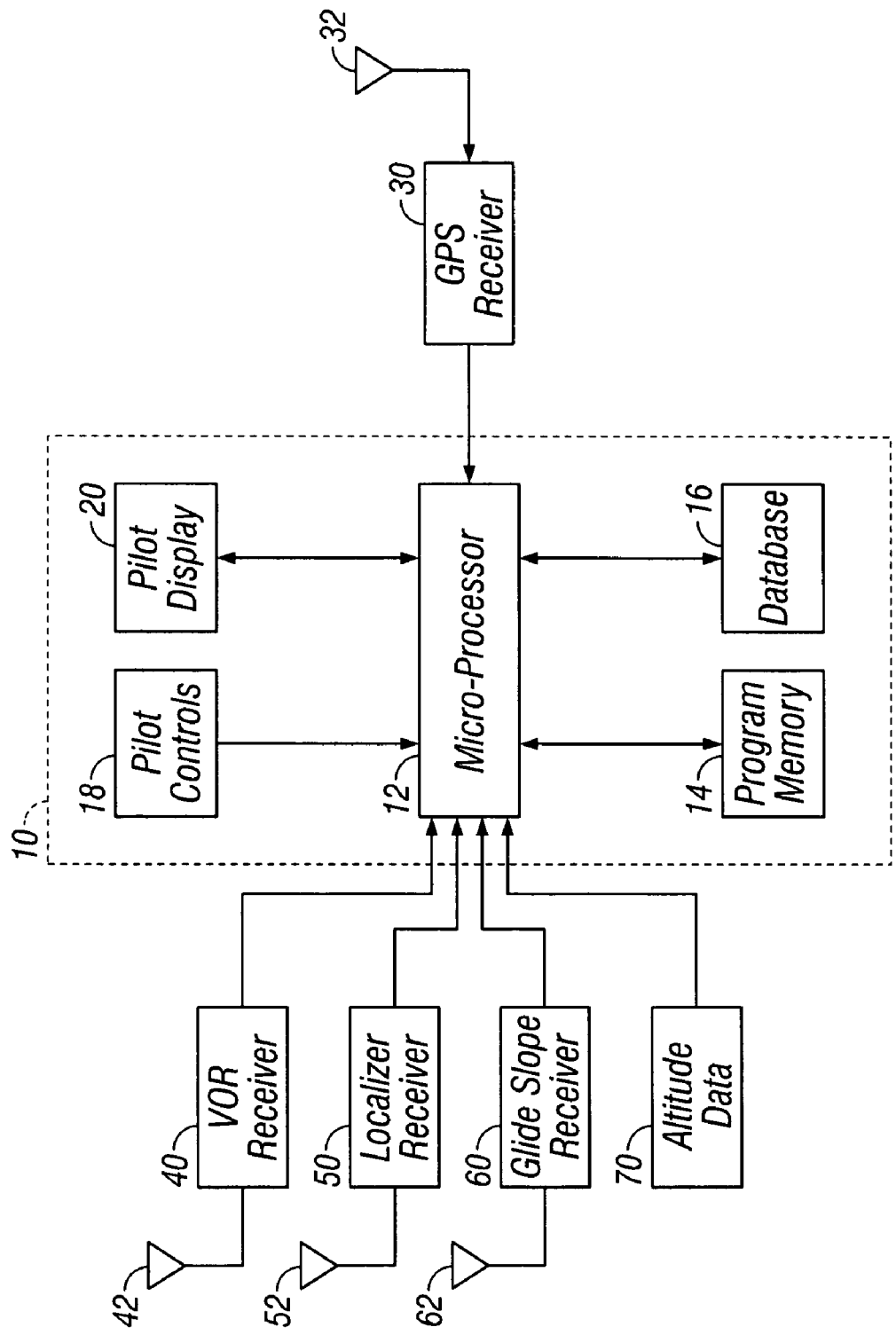
FIG. 1 is a block diagram of a portion of a flight guidance system according to one embodiment of the present invention.

FIG. 1 is a block diagram of a portion of a flight guidance system 10 according to one embodiment of the present invention. The flight guidance system 10, typically including a flight director and autopilot function, includes a microprocessor 12 that is coupled to each of a program memory 14, a database 16, pilot controls 18, and a pilot display 20. In the embodiment shown, the flight guidance system 10 receives aircraft position data from GPS receiver 30, which is connected to GPS antenna 32. The flight guidance system 10 also receives inputs from a VHF Omni-directional Range (VOR) receiver 40, which is connected to VOR antenna 42. As described above, the VOR system is utilized to navigate from VOR transmitter to VOR transmitter along a planned flight path. VOR transmitters are interspersed across a geographic area to provide navigation references for aircraft equipped with VOR receivers 40.

Once an aircraft has navigated past the last VOR transmitter in the planned flight path, it will begin an approach to an airport, and may begin to receive signals from an instrument landing system (ILS). As the air vehicle (not shown in FIG. 1) in which the flight guidance system 10 is installed approaches the runway for landing, it will receive input data from the ILS. An ILS may include a localizer receiver 50, localizer antenna 52, a glide slope receiver 60, and a glide slope antenna 62. The flight guidance system 10 also receives altitude data 70 from an altitude source, for example, an altimeter corrected for barometric pressure (not shown).

The localizer receiver 50, and the glide slope receiver 60 receive signals from corresponding transmitters (not shown in FIG. 1). A localizer transmitter is located at a far end of a runway and a glide slope transmitter is located at an approach end of the runway. The localizer and glide slope transmitters and receivers (50,60) aid a pilot in properly aligning an aircraft with the runway for landing. The localizer is utilized for a lateral alignment, and the glide slope for maintaining a proper vertical approach angle to the runway.

The database 16 may include location information (i.e. latitude, longitude, and elevation) for each respective VOR transmitter, localizer transmitter, and glide slope transmitter. In addition, runway lengths and glide path angles are maintained in database 16 for various runways. In one embodiment, data within database 16 relating to VOR transmitter latitude and longitude are utilized along with aircraft position (latitude and longitude from GPS receiver) to determine a horizontal distance to the transmitter. As utilized herein, a horizontal distance is the distance along the ground between two points. The horizontal distance from the transmitter is utilized along with an angular deviation from a desired flight path, for example from VOR receiver 40, to determine a linear deviation from a desired flight path. Utilizing the linear deviation, the flight guidance system 10 determines, for example, pitch and roll commands to steer the vehicle to the desired flight path.

In the case of VOR, the height above the VOR transmitter, sometimes referred to as a VOR station, is also utilized to determine a cone of confusion for the VOR station, as further described below. Data relating to runway length for individual runways is stored in database 16 which is utilized, along with an angular deviation from the desired flight path provided by localizer receiver 50, to determine a linear deviation from a desired lateral approach to a runway. Data relating to glide path angles for individual runways is also stored in database 16. Such data, along with an angular deviation from the desired glide path angle provided by glide slope receiver 60, is utilized in determining a linear deviation from the desired glide path angle to a runway.

Figure 2:
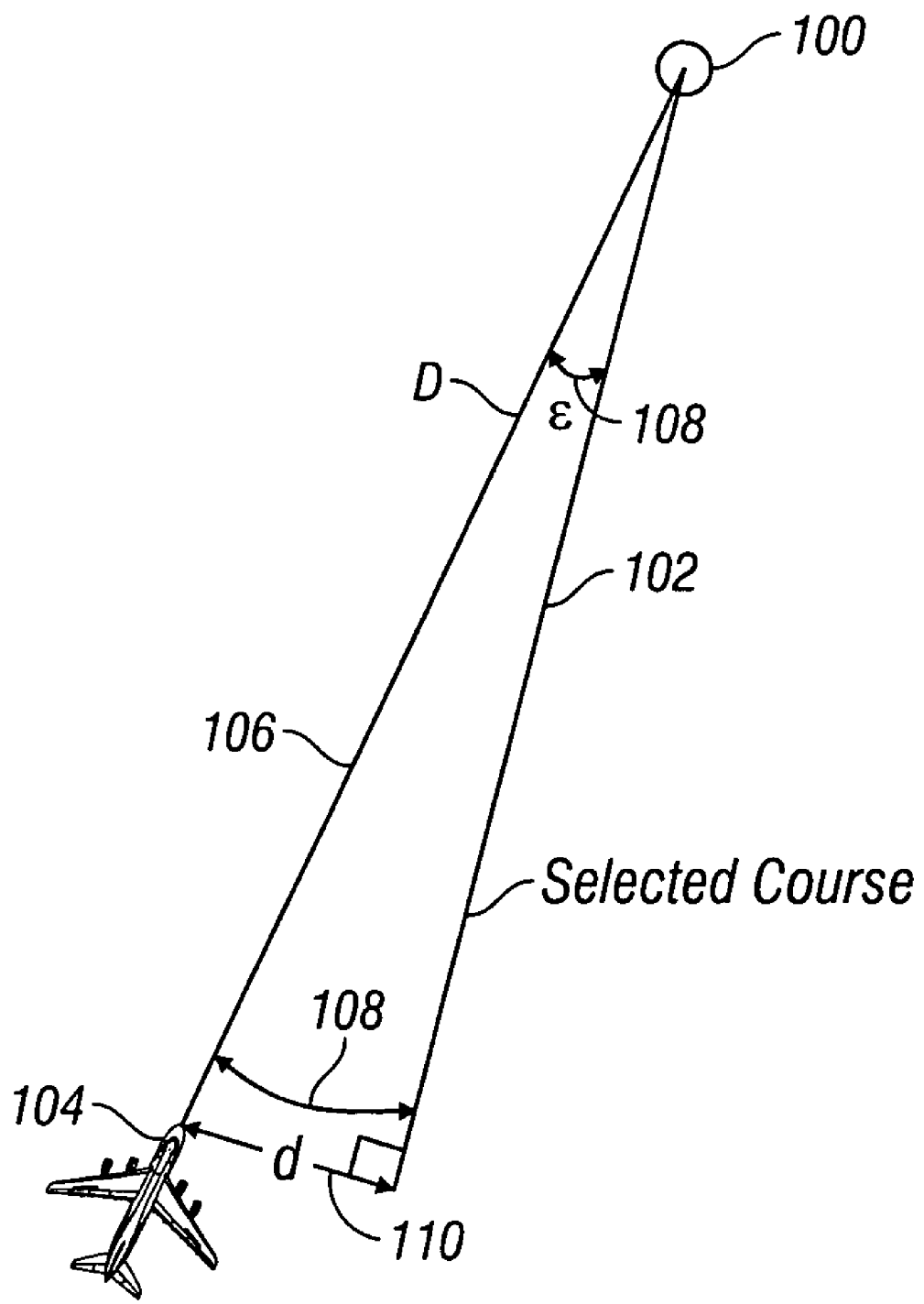
FIG. 2 is a diagram illustrating a number of parameters utilized in calculating a linear deviation from a desired path to a VOR transmitter.

FIG. 2 is a diagram illustrating the parameters utilized in calculating a linear deviation, d, from the desired flight path 102. VOR transmitter 100 operates to provide a direction to the transmitter 106, sometimes referred to as VOR bearing, for an air vehicle 104. The microprocessor 12 (shown in FIG. 1) determines the difference between the desired course 102 and the current VOR bearing 106 as an angular deviation 108, denoted as $\epsilon$. While a pilot would want to change their flight path to that of the desired course 102, an angular deviation does not provide much guidance. For example, if air vehicle 104 is 100 miles from the VOR transmitter 100, an angular deviation of three degrees results in a linear deviation 110 in excess of five miles from the desired flight path 102. However, if air vehicle 104 is only five miles from the VOR transmitter 100, an angular deviation of three degrees results in a linear deviation of about 0.26 miles from the desired flight path 102. From this simple example it is seen that a linear deviation is most useful in correcting a flight path of an air vehicle 104.

In one embodiment, for VOR operation, the flight guidance system 10 (shown in FIG. 1) uses the VOR transmitter 100 location data stored in the database 16 along with the current air vehicle position from GPS receiver 30 to determine a horizontal distance, D, to the VOR transmitter 100. This distance is used along with the angular deviation 108, $\epsilon$, as determined by VOR receiver 40 to determine a linearized deviation 110 from the desired flight path 102. The determination of the linear deviation 110 results in improved flight director and auto pilot tracking. For example, a bank (or turn) angle needed to reduce or eliminate the linear deviation 110 is displayed on pilot display 20 (shown in FIG. 1).

Therefore, to linearize the signal from VOR receiver 40, all that is needed is the horizontal distance to the VOR transmitter 100 and the angular deviation 108, $\epsilon$, provided by VOR receiver 40. Using data relating to the VOR transmitter latitude and longitude from database 16 along with the GPS data for present latitude and longitude provides the horizontal distance, D. The resultant linearized deviation is calculated according to: VOR linear deviation=d=D×Sin($\epsilon$). Utilizing the linear deviation, d, the flight guidance system 10 determines roll commands to steer the vehicle to the desired path 102.

Flight guidance system 10 also utilizes an elevation of VOR transmitter 100 from database 16 and barometric altitude data to determine a height of air vehicle 104 above the VOR transmitter 100. With such data and the horizontal distance D, flight guidance system 10 is able to determine a consistent "cone of confusion" extending above the VOR transmitter. As is further described below, the flight guidance system 10 will use dead reckoning to navigate the air vehicle through the cone of confusion, since the transmitter antenna pattern of VOR transmitter 100 will preclude stable signals being received by VOR receiver 40 (shown in FIG. 1) in this region.

Figure 3:
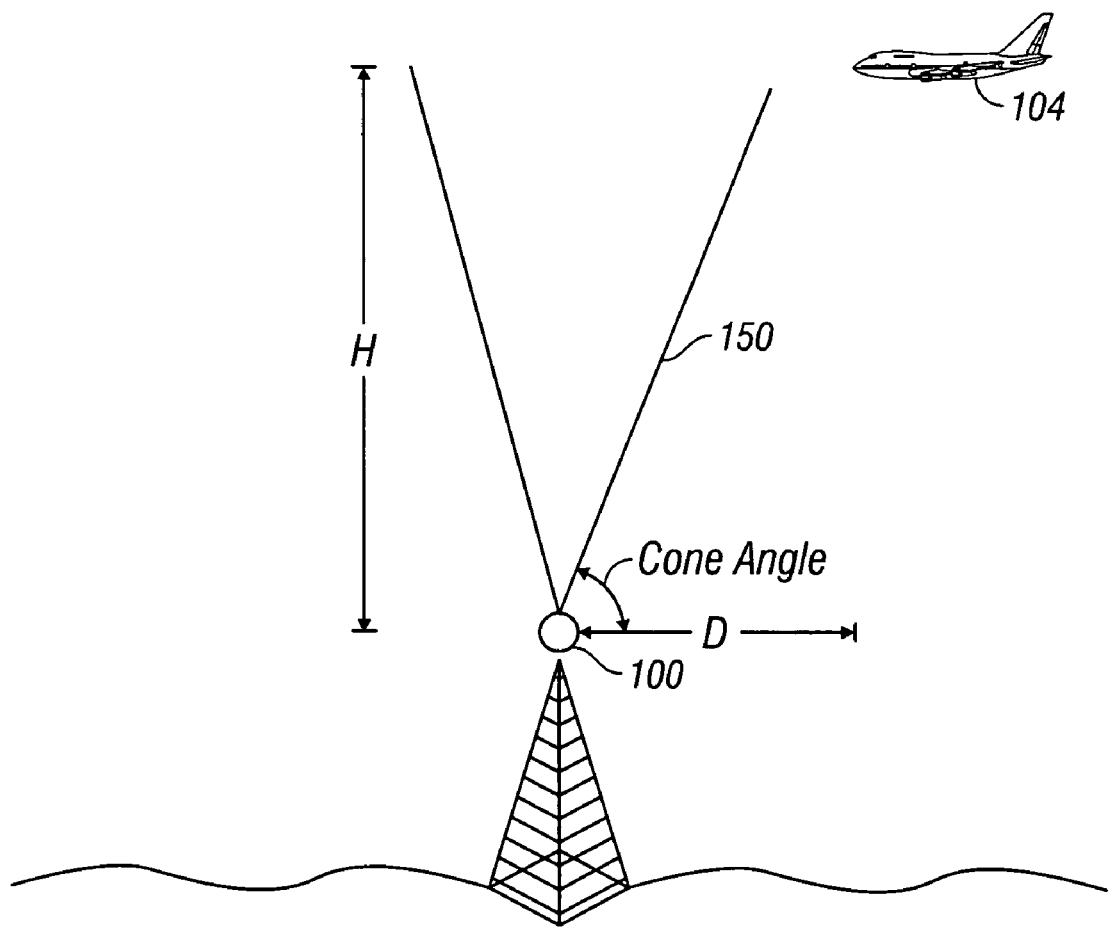
FIG. 3 is a diagram illustrating a number of parameters utilized in estimating a cone of confusion above a VOR transmitter.

FIG. 3 illustrates a cone of confusion 150 created by an antenna array pattern at VOR transmitter 100. To estimate a boundary for the cone of confusion 150, a height, H, above the VOR transmitter 100 is required. This height is found by utilization of the elevation data for VOR transmitter 100 from database 16 and the present aircraft baro-corrected altitude from an air data system (e.g. altitude data 70). The difference between the two is the height, H. The cone of confusion is then defined by the ratio of height, H above the station to the distance to the station, D, as defined above. Determination of whether air vehicle 104 is within the cone of confusion 150, and therefore signals originating from VOR transmitter 100 are no longer useful, is a logical expression. If H>D×tan(Cone Angle), where Cone Angle is nominally 60 degrees, then air vehicle 104 is in the cone of confusion 150, and a pilot should utilize dead-reckoning to navigate through the cone, essentially acting as if the linear deviation, d, is zero.

Figure 4:
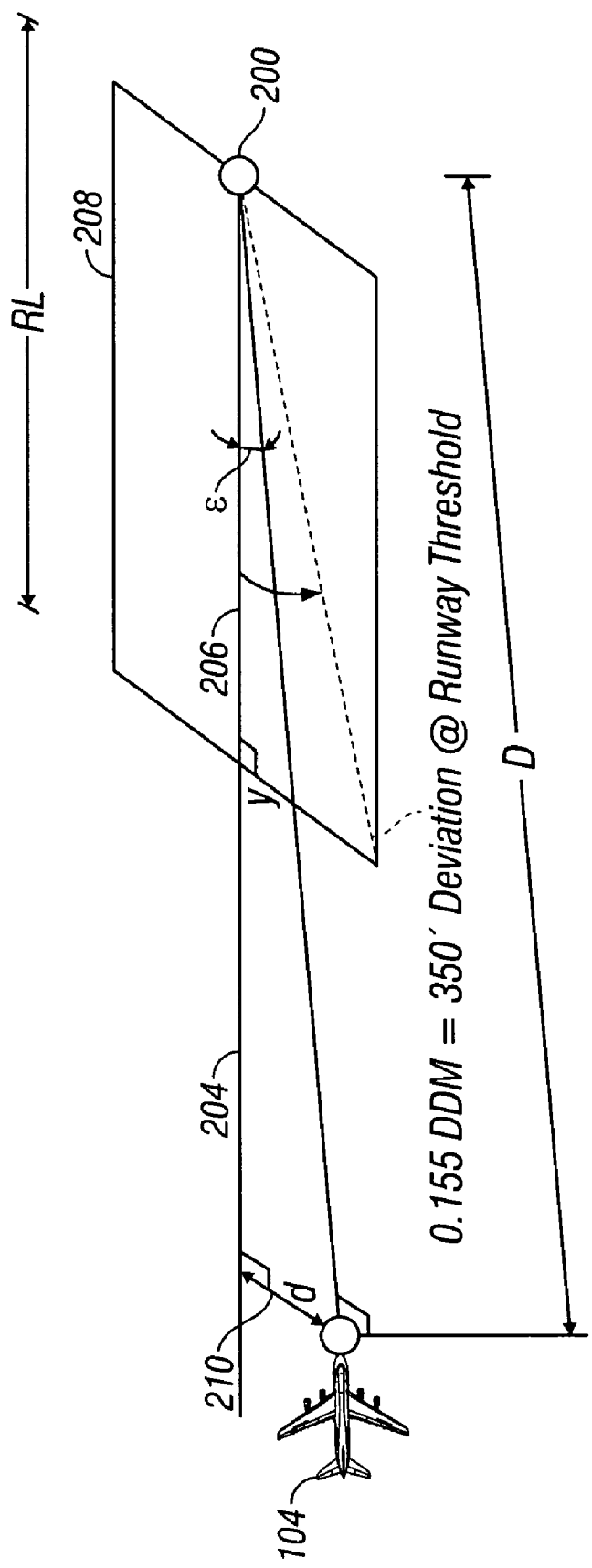
FIG. 4 is a diagram illustrating a number of parameters utilized in calculating a linear deviation from a desired path to a localizer transmitter.

FIG. 4 illustrates operation of the localizer portion of the ILS for linearization of an angular deviation from a desired path, according to another embodiment of the present invention. As described above, a localizer transmitter 200 transmits localizer signals which are received by localizer receiver 50 which then determines an azimuth, or angular lateral deviation from a desired path 204 to guide the air vehicle 104 to the centerline 206 of runway 208. As is shown in FIG. 4, localizer transmitter 200 is located at an end of runway 208 that is opposite an approaching air vehicle 104.

To determine a linear deviation from desired path 204 utilizing the localizer signal, the flight guidance system 10 utilizes the data relating to location for the localizer transmitter 200 from the database 16 along with the current position of air vehicle 104 as determined through GPS receiver 30 to determine a horizontal distance, D, to the localizer transmitter 200. This distance, D is utilized along with a runway length, RL, from the database 16, and the angular deviation, $\epsilon$, as determined by the localizer system (transmitter 200, localizer receiver 50) into a linear deviation 210, d, with a constant scale factor to improve auto pilot tracking and performance of the flight guidance system 10.

Specifically, to linearize the deviation from the localizer portion of the ILS, an end of runway deviation, y, is first determined through normalization of the localizer angular deviation by accounting for the constant beam width of 350 feet full scale at the threshold (approach end) of all runways. A full scale value (350 feet from a centerline of the runway 208 at the end of the runway opposite the localizer transmitter 200) for localizer angular deviation is represented as 0.155 DDM (difference in depth of modulation) at an output of the localizer receiver 50. A difference in depth of modulation occurs because the localizer transmitter 200 transmits two modulated signals.

Therefore, an end of runway deviation is calculated as $$y = \frac{\varepsilon}{0.155 \text{ DDM}} \times 350 \text{ feet} = 2558\ \varepsilon(\text{ft}) = 688.258\ \varepsilon(\text{m}).$$

To then determine a linear deviation, d, at the air vehicle 104 from the desired path 204, the distance D, to localizer transmitter, and the database value for the length of the runway, RL, along with the end of runway deviation, y, is are utilized according to $$d = \frac{D \times y}{\sqrt{RL^2 + y^2}}.$$

Such an approach by an air vehicle 104 is sometimes referred to as an ILS front course approach.

Figure 5:
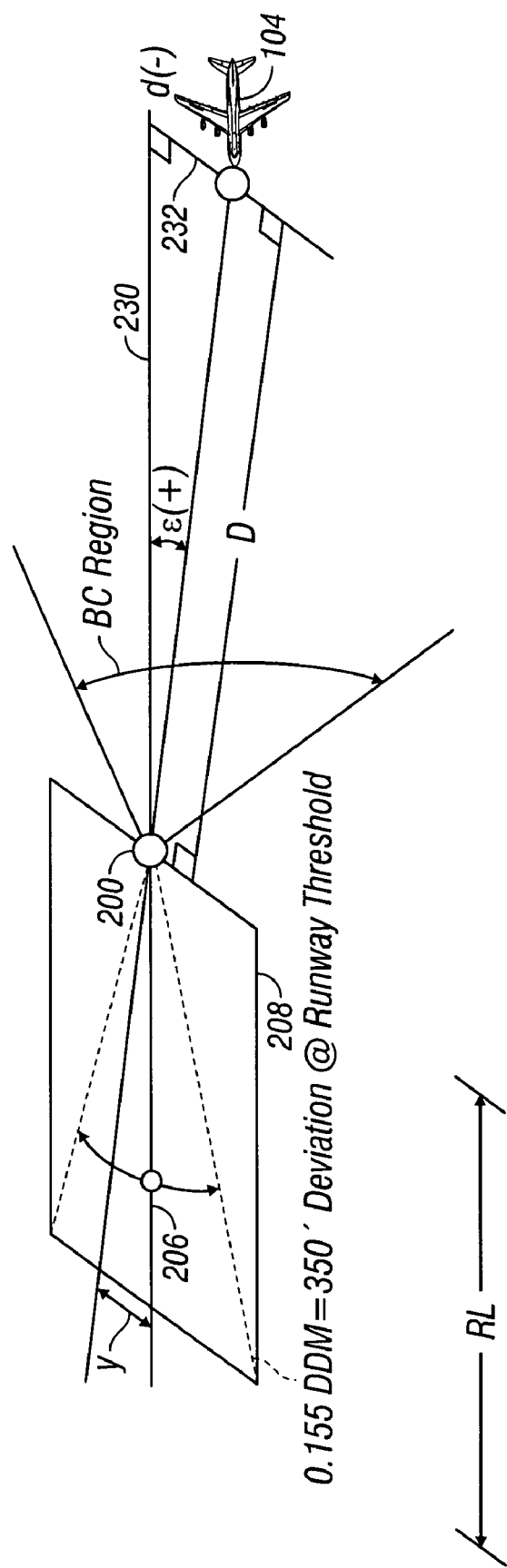
FIG. 5 is a diagram illustrating a number of parameters utilized in calculating a linear deviation from a desired back course path to a localizer transmitter.

Sometimes, perhaps due to wind conditions, an aircraft 104 must approach the runway 208 in a direction that is opposite to the approach direction intended when the localizer transmitter 200 was installed. Such an approach is sometimes referred to as a back course approach. Determination of a linear deviation from a desired back course approach is illustrated in FIG. 5. During a back course approach, the localizer transmitter 200 is located at the approach end of the runway 208. As above, the localizer transmitter 200 transmits localizer signals which are received by localizer receiver 50 which then determines an azimuth, or angular lateral deviation from a desired path 230 to guide the air vehicle 104 to the centerline 206 of runway 208, albeit from the opposite direction. The linearization equations are the same for back course approach as the ILS front course approach described above except for a change in sign.

Therefore, an end of runway deviation is calculated as $$y = \frac{\varepsilon}{0.155 \text{ DDM}} \times 350 \text{ feet} = 2558 \; \varepsilon(\text{ft}) = 688.258 \; \varepsilon(\text{m}).$$

To then determine a linear deviation 232, d, at the air vehicle 104 from the desired path 230, the distance D, to the localizer transmitter, and the database value for the length of the runway, RL, along with the end of runway deviation, y, are utilized according to $$d = -\frac{D \times y}{\sqrt{RL^2 + y^2}}.$$

Figure 6:
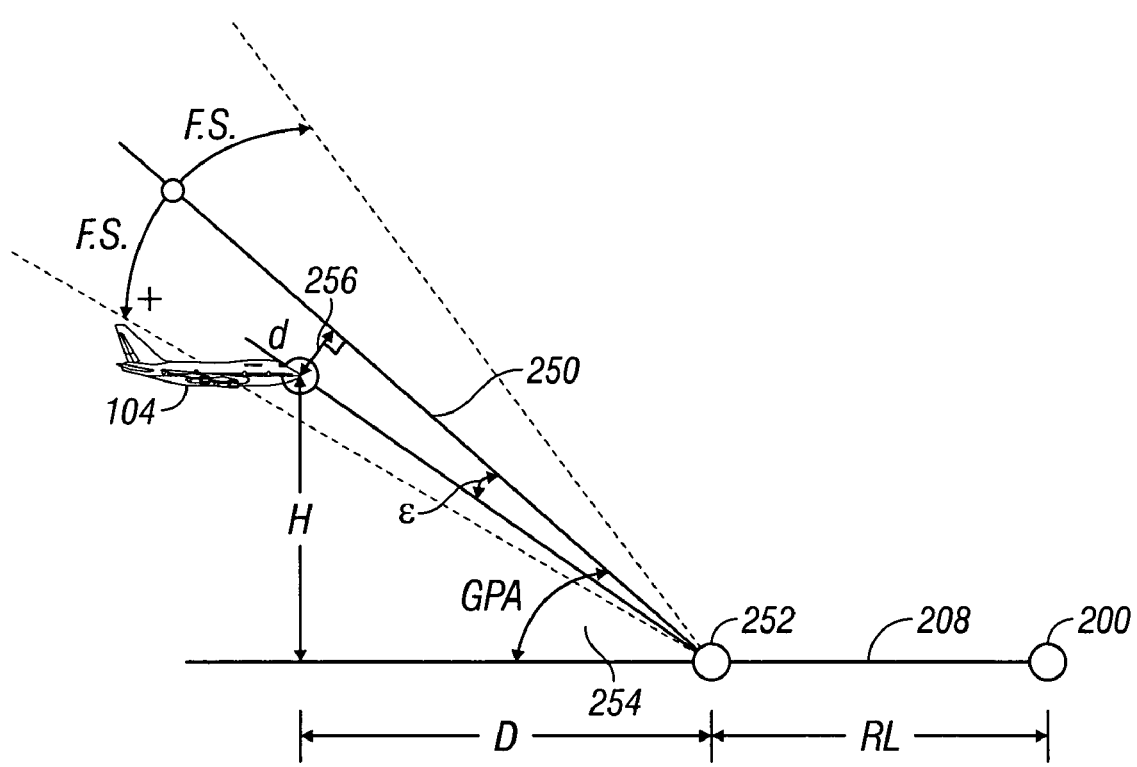
FIG. 6 is a diagram illustrating a number of parameters utilized in calculating a linear deviation from a desired path to a glide slope transmitter.

FIG. 6 illustrates operation of the glide slope portion of the ILS. Specifically, to determine a linear deviation from the glide slope path 250, the flight guidance system 10 uses data relating to a location for the glide slope transmitter 252 from the database 16 along with the current aircraft position from GPS receiver 30 to determine a horizontal distance, D, to the glide slope transmitter 252. This horizontal distance, D, is used along with the glide path angle 254 from the database 16 to convert an angular altitude deviation signal received from glide slope receiver 60 into a linearized deviation, d, 256 with a constant scale factor to improve autopilot tracking and operation of flight guidance system 10.

To linearize the angular error from the glide path angle utilizing the glide slope portion of the ILS, the distance, D, to the glide slope transmitter 252 is used. The distance, D, is determined as the difference between air vehicle position, provided by GPS receiver 30 and data relating to the location of the glide slope transmitter 252 from database 16. In one embodiment, the database 16 does not include data relating to a position of the glide slope transmitter 252. Rather, in such an embodiment, data relating to a position of the localizer transmitter 200 along with data relating to runway length are utilized to estimate a position of the glide slope transmitter 252.

The glide path angle, GPA, stored in database 16, and height above the station, H, which is derived from the transmitter 252 elevation in database 16, and elevation of air vehicle 104 (from either a GPS or an air data computer 70 (shown in FIG. 1)) are utilized to determine if an unwanted side lobe of the glide slope signal is being received, as opposed to the desired main beam. This determination of main/side lobe helps to prevent false captures.

FIG. 6 shows the geometry of the linearization, where $\varepsilon$ is the GS deviation error in DDM, and the full scale (F.S.) value for glide slope deviation is represented as 0.175DDM at the glide slope receiver 60 output, corresponding to 0.2×GPA from the database 16. The glide slope deviation error angle in radians is $$\alpha = \frac{\varepsilon}{0.175 \text{ DDM}} \times 0.2 \text{ GPA},$$

and the glide slope linear deviation is $$d = \frac{D}{\cos(GPA - \alpha)} \times \sin(\alpha).$$

If (0.75×GPA)<arctan(H/D)<(1.5×GPA), then capture is allowed.

Figure 7:
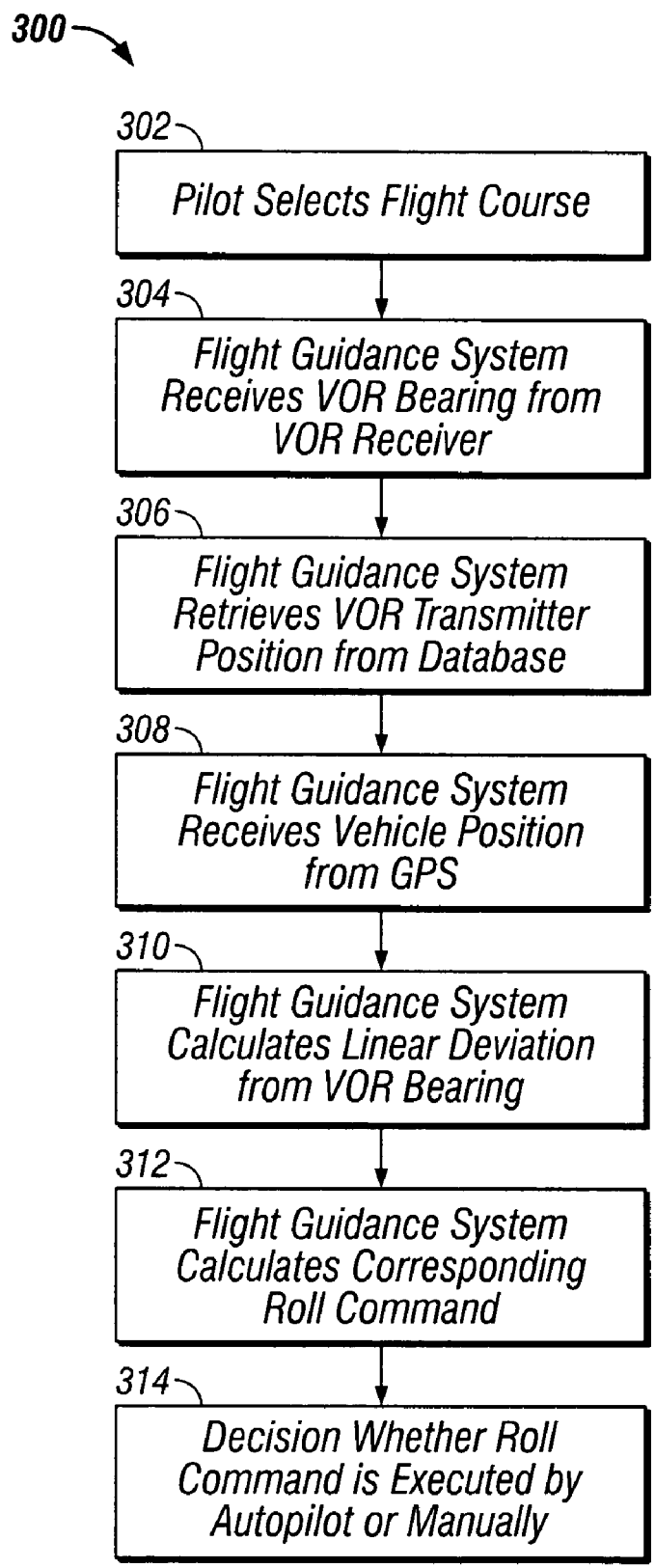
FIG. 7 is a flowchart describing a method for determining a linear deviation from a desired path to a VOR transmitter.

FIG. 7 is a flowchart 300 illustrating the methods disclosed herein for linearizing a deviation from a VOR bearing signal. Referring to flowchart 300, a pilot selects 302 a flight course. Flight guidance system 10 (shown in FIG. 1) receives 304 a VOR bearing from the VOR receiver 40 (shown in FIG. 1). The flight guidance system 10 retrieves 306 a position (i.e. latitude, longitude, and elevation) of the VOR transmitter 100 (shown in FIG. 2). The flight guidance system 10 then receives 308 a vehicle position (i.e. latitude, longitude, and elevation) from a GPS receiver 30 (shown in FIG. 1). The flight guidance system 10 calculates 310 a linear deviation from the VOR bearing utilizing the methodology described with respect to FIG. 2. Upon calculation 310 of the linear deviation, the flight guidance system 10 is configured to calculate 312 a roll command that corresponds to a roll that is needed to minimize the deviation from the VOR bearing signal. The pilot then decides 314 whether the roll command is to be executed manually or through an auto pilot system.

Figure 8:
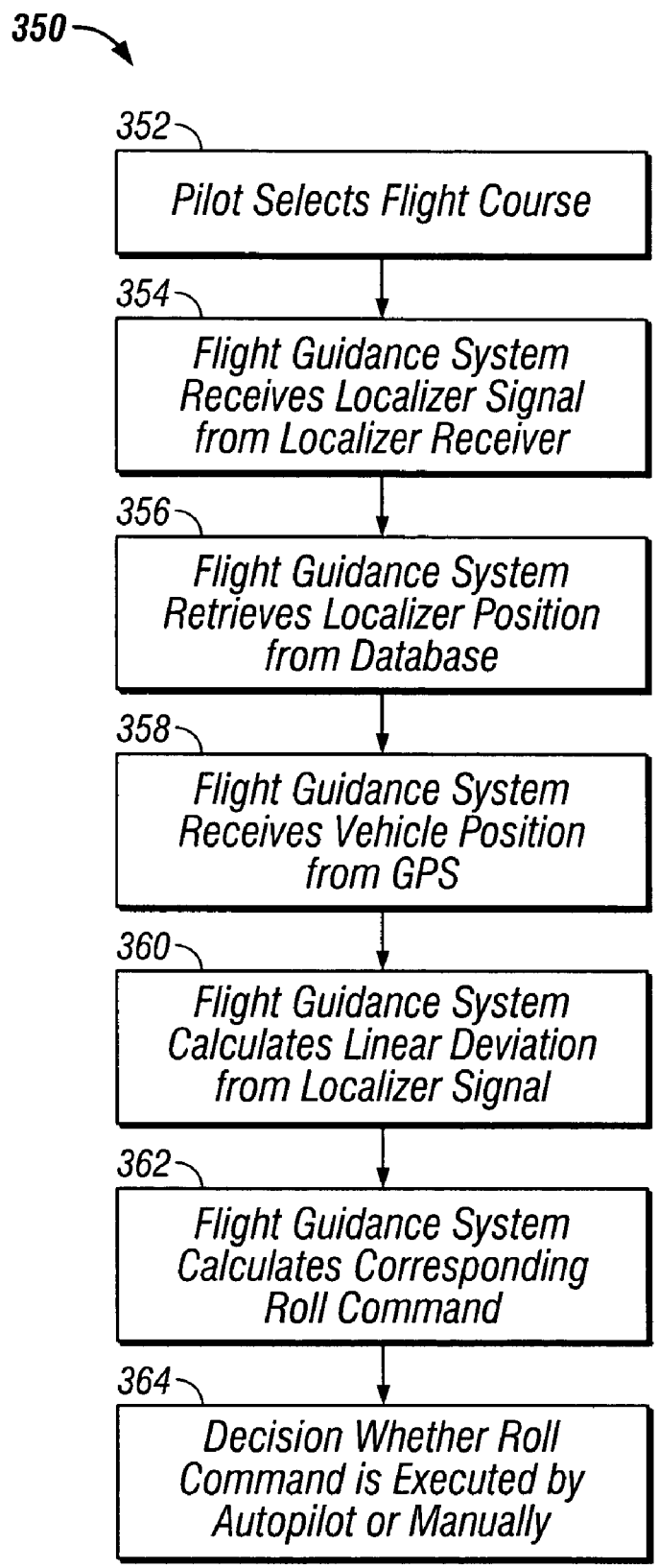
FIG. 8 is a flowchart describing a method for determining a linear deviation from a desired path to a localizer transmitter.

FIG. 8 is a flowchart 350 illustrating the methods disclosed herein for linearizing a deviation from a center of a localizer signal that is a portion of the functionality provided by an ILS. The method is similar to that associated with determining a linear deviation from a VOR bearing (shown in FIG. 7). Referring to flowchart 350, a pilot selects 352 a flight course. Flight guidance system 10 (shown in FIG. 1) receives 354 localizer data from the localizer receiver 50 (shown in FIG. 1). The localizer data is in the form of a deviation from a null between the localizer's transmitted beams. The flight guidance system 10 retrieves 356 a position (i.e. latitude, longitude, elevation, and runway length) of the runway associated with the localizer transmitter 200 (shown in FIG. 4). The flight guidance system 10 then receives 358 a vehicle position (i.e. latitude, longitude, and elevation) from a GPS receiver 30 (shown in FIG. 1). The flight guidance system 10 calculates 360 a linear deviation from the localizer signal utilizing the methodology described with respect to FIG. 4. Upon calculation 360 of the linear deviation, the flight guidance system 10 is configured to calculate 362 a roll command that corresponds to a roll that is needed to minimize the deviation from the localizer signal. The pilot then decides 364 whether the roll command is to be executed manually or through an auto pilot system. A method similar to that illustrated by flowchart 350 is utilized in determining a linear deviation from a desired path for a back course approach to a runway.

Figure 9:
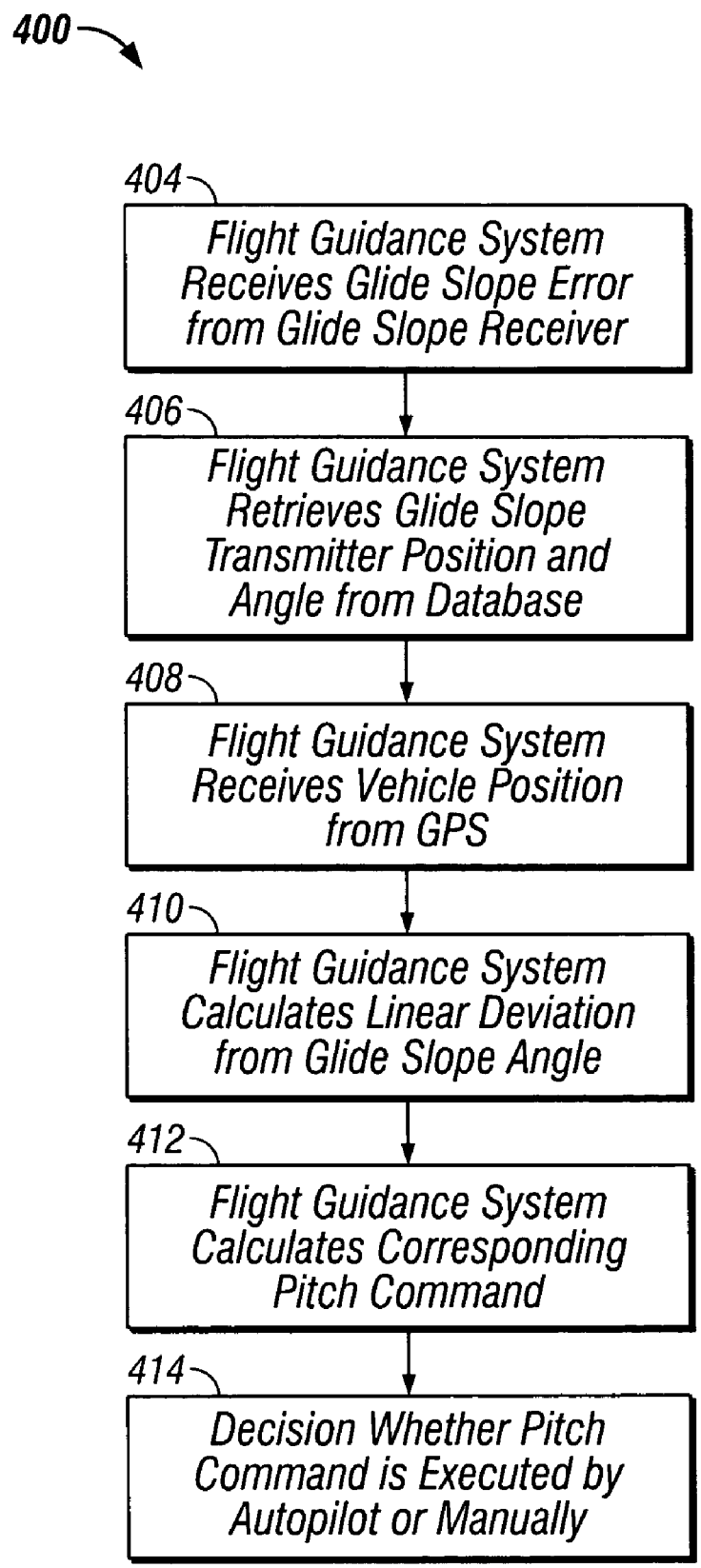
FIG. 9 is a flowchart describing a method for determining a linear deviation from a desired glide slope angle.

FIG. 9 is a flowchart 400 illustrating the methods disclosed herein for linearizing an angular altitude deviation from the ILS glide path. The glide slope angular altitude deviation is a portion of the functionality provided by an ILS. The method is similar to that associated with determining a linear deviation from a VOR bearing (shown in FIG. 7). Referring to flowchart 400, flight guidance system 10 (shown in FIG. 1) receives 404 a glide slope error angle from the glide slope receiver 60 (shown in FIG. 1). The flight guidance system 10 retrieves 406 a position (i.e. latitude, longitude, elevation) and a glide path angle that is defined for the runway associated with glide slope transmitter 252 (shown in FIG. 6). The flight guidance system 10 then receives 408 a vehicle position (i.e. latitude, longitude, and elevation) from a GPS receiver 30 (shown in FIG. 1). The flight guidance system 10 calculates 410 a linear deviation from the glide path angle utilizing the methodology described with respect to FIG. 6. Upon calculation 410 of the linear deviation, the flight guidance system 10 calculates 412 a pitch command that is needed to reduce the deviation from the glide path angle. The pilot then decides 414 whether the pitch command is to be executed manually or through an auto pilot system.

The described systems and methods are able to achieve improved performance over classical linearization methods, due to the use of database parameters to get actual values for different installations rather than assuming default values.

While the invention has been described in terms of various specific embodiments, those skilled in the art will recognize that the invention can be practiced with modification within the spirit and scope of the claims.

What is claimed is:

1. A method for determining a deviation of a vehicle from a desired course, said method comprising:
   receiving a bearing signal from a transmitter;
   accessing a database to obtain transmitter position information and operating characteristics of the transmitter;
   obtaining vehicle position information based on a GPS signal; and
   determining a deviation of the vehicle from the desired course utilizing the transmitter information, the vehicle position information, and the bearing signal.

2. The method according to claim 1 wherein said receiving step comprises receiving a bearing signal from at least one of a VOR transmitter, a localizer transmitter of an instrument landing system (ILS), and a glide slope transmitter of the ILS.

3. The method according to claim 1 wherein said determining step comprises determining a linear VOR deviation based on said transmitter position information, said transmitter position information identifying latitude and longitude for a VOR transmitter.

4. The method according to claim 1 wherein said determining step comprises determining a lateral deviation of the vehicle from a desired approach to a runway based on said transmitter position information, said transmitter information identifying latitude, longitude, and runway length of a localizer transmitter.

5. The method according to claim 1 wherein said determining step comprises determining an altitude deviation from a desired altitude approach to a runway based on said transmitter position information, said transmitter position information identifying latitude, longitude, elevation and glide path angle of a glide slope transmitter.

6. The method according to claim 1 wherein said accessing step comprises obtaining from the database a glidepath angle, an elevation and a length for the runway being approached by the vehicle and said determining step determines an altitude deviation from a desired altitude approach to the runway based on a latitude and a longitude of a localizer transmitter and the elevation and length of the runway.

7. The method according to claim 1 further comprising calculating a flight director roll command utilizing the deviation.

8. The method according to claim 1 further comprising initiating a flight director roll command to an auto-pilot function utilizing the deviation.

9. The method according to claim 1 wherein said determining step partitions processing among multiple processors to calculate the deviation and resulting flight director commands.

10. The method according to claim 1 further comprising identifying a VOR cone of confusion extending from the transmitter based on the transmitter position information and vehicle position information.

11. The method according to claim 1 further comprising:
    identifying when the vehicle is in a VOR cone of confusion extending from the transmitter based on the transmitter position information and vehicle position information;
    initiating a flight director roll command utilizing the deviation when the vehicle is not within the cone of confusion extending from the transmitter; and
    initiating a flight director roll command based on a previous heading when the vehicle is within the cone of confusion.

12. The method according to claim 1 wherein said accessing step obtains a latitude, a longitude, and an elevation for the transmitter.

13. The method according to claim 1 wherein said obtaining step obtains a latitude, a longitude, and an elevation for the vehicle.

14. The method according to claim 1 wherein the transmitter is a VOR transmitter and wherein said determining step comprises determining a distance between the VOR transmitter and the vehicle based on a latitude and longitude of the VOR transmitter and a latitude and longitude of the vehicle.

15. The method according to claim 1 wherein the transmitter is a localizer transmitter and wherein said determining step comprises determining a distance between the localizer transmitter and the vehicle based on a latitude and longitude of the localizer transmitter and a latitude and longitude of the vehicle.

16. The method according to claim 1 wherein the transmitter is a glide slope transmitter and wherein said determining step comprises determining a distance between the glide slope transmitter and the vehicle based on a latitude and longitude of the glide slope transmitter and a latitude and longitude of the vehicle.

17. The method according to claim 1 wherein the deviation is a lateral deviation from a desired approach to a runway, wherein said determining step comprises:
    determining a distance, D, between the transmitter and the vehicle;
    obtaining an end of runway deviation, y, through normalization of localizer deviation $\epsilon$, according to $$y = \frac{\varepsilon}{0.155} \times 350 \text{ feet} = 2558\ \varepsilon(\text{ft}) = 688.258\ \varepsilon(\text{m});$$

accessing the database to obtain a runway length, RL; and calculating a linear deviation, d, at the vehicle according to:

$$d = \frac{D \times y}{\sqrt{RL^2 + y^2}}.$$

18. The method according to claim 1 wherein the deviation is a lateral deviation from a desired back course approach to a runway, wherein said determining step comprises:
  determining a distance, D, between the transmitter and the vehicle;
  obtaining an end of runway deviation, y, through normalization of localizer deviation $\epsilon$, according to $$y = \frac{\varepsilon}{0.155} \times 350 \text{ feet} = 2558\ \varepsilon(\text{ft}) = 688.258\ \varepsilon(\text{m});$$

accessing the database to obtain a runway length, RL; and
  calculating a linear deviation, d, at the vehicle according to:

$$d = -\frac{D \times y}{\sqrt{RL^2 + y^2}}.$$

19. The method according to claim 1 wherein the transmitter is a glide slope transmitter and the deviation is an altitude deviation from a desired approach to a runway, wherein said determining step comprises:
  determining a distance, D, between the transmitter and the vehicle;
  accessing the database to obtain a glide path angle, GPA;
  determining a glide slope deviation error angle in radians according to $$\alpha = \frac{\varepsilon}{0.175 \text{ DDM}} \times 0.2 \text{ GPA,}$$

where $\epsilon$ is the glide slope deviation error; and
  determining a glide slope linear deviation according to $$d = \frac{D}{\cos(GPA - \alpha)} \times \sin(\alpha),$$

where D is the distance between the air vehicle and the glide slope transmitter.

20. The method according to claim 1 wherein the transmitter is a VOR transmitter and wherein said determining step comprises:
  determining a distance, D, between the transmitter and the vehicle;
  obtaining a linear VOR deviation, d, according to d=D×Sin($\epsilon$), where is a VOR angular deviation.

21. The method according to claim 1 wherein the transmitter is a VOR transmitter and wherein said determining step comprises:
  determining a distance, D, between the transmitter and the vehicle;
  determining a height above the VOR transmitter, H, from the transmitter position information and a present vehicle altitude from an air data system; and
  determining when the vehicle is in a cone of confusion, the vehicle being in the cone if H>D×tan(cone angle) is true, where cone angle has a nominal value of 60 degrees.

22. A system for determining a deviation of a vehicle from a desired course, the system comprising:
  a receiver receiving a bearing signal from a transmitter;
  a database storing transmitter position information identifying a position of the transmitter;
  a GPS receiver obtaining vehicle position information identifying a current position of the vehicle based on a GPS signal; and
  a controller determining a deviation of the vehicle from the desired course utilizing the transmitter position information, the vehicle position information, and the bearing signal.

23. The system according to claim 22 wherein said controller determines a height of the vehicle above a transmitter based on an elevation of the transmitter and an altitude of the vehicle.

24. The system according to claim 22 wherein said controller determines a horizontal distance between a transmitter and the vehicle based on latitude and longitude of the transmitter and latitude and longitude of the vehicle.

25. The system according to claim 22 wherein said controller determines a horizontal distance, D, between a glide slope transmitter and a vehicle based on one or more of a latitude and longitude of a localizer transmitter, a latitude and longitude of the glide slope transmitter, an elevation of the runway, a length of the runway and a glide path angle (GPA) for the runway, and the vehicle position information, including latitude, longitude, and an altitude.

26. The method according to claim 1 wherein said determining step calculates a linear deviation.

27. The method according to claim 1 wherein said determining step calculates a lateral deviation.

28. The system according to claim 22 wherein said controller determines a linear deviation.

29. The system according to claim 22 wherein said controller determines a lateral deviation.

* * * * *